(12) United States Patent
Baker (10) Patent No.: US 11,884,562 B2
(45) Date of Patent: Jan. 30, 2024

(54) APPARATUS AND METHOD FOR UREA ELECTROLYSIS WITH CONTROLLED ALKALINITY

(71) Applicant: U.S. Army Combat Capabilities Development Command, Army Research Laboratory, Adelphi, MD (US)

(72) Inventor: David R. Baker, Silver Spring, MD (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 230 days.

(21) Appl. No.: 17/319,203

(22) Filed: May 13, 2021

(65) Prior Publication Data

US 2022/0363572 A1 Nov. 17, 2022

(51) Int. Cl.
| | | |
|---|---|---|
| *C02F 1/461* | (2023.01) | |
| *C02F 1/467* | (2023.01) | |
| *C02F 103/00* | (2006.01) | |
| *C02F 101/38* | (2006.01) | |

(52) U.S. Cl.
CPC ........ *C02F 1/46109* (2013.01); *C02F 1/4672* (2013.01); *C02F 2001/46133* (2013.01); *C02F 2101/38* (2013.01); *C02F 2103/001* (2013.01); *C02F 2103/005* (2013.01); *C02F 2201/4616* (2013.01); *C02F 2209/06* (2013.01)

(58) Field of Classification Search
CPC ......................... C02F 2101/38; C02F 2209/06
See application file for complete search history.

(56) References Cited

U.S. PATENT DOCUMENTS

| | | | |
|---|---|---|---|
| 4,152,215 A | 5/1979 | Yoshino et al. | |
| 8,388,920 B2 | 3/2013 | Botte | |
| 8,562,929 B2 | 10/2013 | Botte | |
| 9,062,382 B2 | 6/2015 | Botte | |
| 2017/0189595 A1* | 7/2017 | Ding | ........................ C25F 1/00 |

OTHER PUBLICATIONS

Macounová, K., et al., "Generation of Natural pH Gradients in Microfluidic Channels for Use in Isoelectric Focusing," Anal. Chem., vol. 72, No. 16, Aug. 15, 2000, pp. 3745-3751.
Read, T., et al., "In Situ Control of Local pH Using a Boron Doped Diamond Ring Disk Electrode: Optimizing Heavy Metal (Mercury) Detection," Anal. Chem., vol. 86, No. 1, Dec. 9, 2013, pp. 367-371.

(Continued)

*Primary Examiner* — Salil Jain
(74) *Attorney, Agent, or Firm* — Emily C. Moscati (57) ABSTRACT

Apparatus and method for electrolysis of urea is capable of removing urea from waste-water generated by human urine or agricultural run-off while simultaneously producing cleaner water and hydrogen gas. The apparatus and method employ at least one water reduction electrode located close to at least one urea oxidation electrode. The water reduction electrode operates to generate a locally high pH such that the urea oxidation electrode operates in a locally high pH envelope where it can perform its reaction efficiently to break down the urea with little or no impact on the pH of the bulk solution.

18 Claims, 12 Drawing Sheets

(56) References Cited

OTHER PUBLICATIONS

Baker, D., et al., "Expansion of the urea electrocatalytic oxidation window by adsorbed nickel ions," J. Appl. Electrochem., vol. 49, Jul. 3, 2019, pp. 883-893.

Vedharathinam, V., et al., "Direct evidence of the mechanism for the electro-oxidation of urea on Ni(OH)2 catalyst in alkaline medium," Electrochimica Acta, vol. 108, Jul. 9, 2013, pp. 660-665.

* cited by examiner

APPARATUS AND METHOD FOR UREA ELECTROLYSIS WITH CONTROLLED ALKALINITY

GOVERNMENT INTEREST

The embodiments herein may be manufactured, used, and/or licensed by or for the United States Government without the payment of royalties thereon.

BACKGROUND

Technical Field

The embodiments herein generally relate to apparatuses and methods for the electrolysis of urea.

Description of the Related Art

Urea is a significant pollutant in waste waters containing human or animal waste, for example urine, and in agricultural runoff. In all prior systems for the electrolysis of urea, high solution pH and caustic materials are needed to create the basic conditions required for the achievement of reasonably high electrochemical reaction rates for the efficient breakdown and elimination or removal of urea. At a minimum, prior systems require the use of 0.01M potassium hydroxide (pH 12). Typically, potassium hydroxide is added to the aqueous solution at a concentration of 1M or more in order to perform the reaction; 5M is a commonly used concentration. Many prior efforts for the electrolytic breakdown of urea have focused on increasing the alkalinity of the solution, to include the use of solutions of greater than 5M potassium hydroxide, in order to achieve desired reaction rates.

There are hazards associated with the handling of the highly alkaline materials because the alkaline materials can cause injury to personnel if the alkaline materials come into contact with the skin, eyes, and mucosal surfaces of the personnel. The highly alkaline materials require special handling procedures and equipment that drive up the costs of eliminating urea using the prior systems. The highly alkaline materials are corrosive and cause damage to equipment more quickly, which increases maintenance costs and requires more frequent replacement of equipment. The need remains for an effective system for the electrolytic breakdown of urea that avoids the problems associated with the use of highly alkaline materials.

SUMMARY

In view of the foregoing, the embodiments herein provide for the electrochemical breakdown of urea into nitrogen, carbon dioxide, and hydrogen gasses using nickel-based electrodes to pass electricity to the urea dissolved in a solution with neutral alkalinity (pH 6-9). Since the reaction only occurs in high pH solutions (pH>11), other electrodes simultaneously reduce water nearby producing an excess of $OH^-$ ions and raising the pH near the urea oxidation electrode sufficient to perform the urea electrolysis reaction. The distance between electrodes and the amount of current used to reduce water affect the pH and subsequently the urea reaction rate.

The embodiments herein are intended to accomplish the urea electrolysis reaction, which only takes place in highly alkaline environments, and perform it in bulk neutral solutions. This makes it safer to use, requires no addition of alkaline chemicals, and needs simpler separations after the reaction is complete.

The embodiments herein modify the pH electrochemically, only on the microscopic scale, instead of adding caustic chemicals to the reaction solution. As a result, the bulk solution retains a neutral acidity/alkalinity while still being able to accomplish the desired reaction.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring to FIGS. 1-4, some embodiments herein are directed to an apparatus 100 for removing urea from an aqueous solution 101. In some embodiments herein, the apparatus 100 comprises a container 102, at least one urea oxidation electrode 104, at least one water reduction electrode 106, at least one counter electrode 108, and at least one power supply 110. The container 102 has an interior 112 and is configured to maintain a reaction environment comprising a quantity of the aqueous solution. In the illustrated embodiment of FIGS. 1-4, the container 102 has a bottom 114 and a bounding wall 116 surrounding the bottom so as to form the container 102 with the interior 112 for holding a quantity of the aqueous solution. The container 102 is an example of a reactor cell used in some of the embodiments herein.

The urea oxidation electrode 104 is disposed in the interior 112 of the container 102. The water reduction electrode 106 is also disposed in the interior 112 of the container 102. The water reduction electrode 106 is configured to produce a hydroxide anion concentration in a first volume 118 containing a portion of the aqueous solution. The apparatus 100 is configured to provide for the volume 118 and for the aqueous solution in the volume 118 to be in contact with at least a portion of the urea oxidation electrode 104. The counter electrode 108 is also disposed in the interior 112 of the container 102 and is in contact with a second volume 120 within the interior 112 of the container 102 and bordering on the counter electrode 108 that contains a portion of the aqueous solution. The aqueous solution in the volume 120 is in fluid communication with the aqueous solution in the volume 118. The counter electrode 108 has a voltage and/or current applied to it to cause an electrochemical reaction at the counter electrode 108 to maintain the charge balance with currents passing at the water reduction electrode 106 and at the urea oxidation electrode 104.

The power supply 110 applies one or more voltages and/or currents between the counter electrode 108 and the water reduction electrode 106 and between the urea oxidation electrode 104 and the counter electrode 108 to drive the electrochemical reactions at these electrodes. In some embodiments herein, the electrolytic oxidation of urea is performed by applying one or more voltages between the counter electrode 108 and the water reduction electrode 106 and between the urea oxidation electrode 104 and the counter electrode 108. In some examples, the power supply may be a power supply/electrochemical controller 110 that works by modifying the current through the each of the electrodes until the desired voltage or voltages are reached. In an example, the power supply/electrochemical controller may be a potentiostat, although other suitable power supply devices may be used. The current that passes through each electrode will depend on and change with the voltage and desired local solution pH. In some embodiments herein, currents in the range of about 10 mA/cm$^2$ may be used. The concentration of hydroxide anions is sufficiently high in the aqueous solution in the volume 118, which contacts at least the portion of the urea oxidation electrode 104, such that urea removal from the aqueous solution, by electrolytic breakdown of urea, proceeds at a sufficiently high rate as to be practically useful when the apparatus 100 is in operation.

In some embodiments herein, the urea oxidation electrode 104 is made of a material that contains nickel such as, for example, nickel, nickel alloys, and any other material that can provide an active surface of nickel in one or more oxidized phases (e.g., nickel hydroxide ($Ni(OH)_2$) and/or NiOOH). An example of a suitable nickel alloy is nickel-cobalt alloy (Ni—Co), but nickel alloys suitable for use in the embodiments herein are not limited to Ni—Co. Nickel acts as a catalyst that promotes the electrolytic oxidation of urea ($CO(NH_2)_2$) into products including $CO_2$ and $N_2$.

Under the reaction conditions in the embodiments herein, the apparatuses herein are configured such that the process for elimination or removal of urea using these apparatuses does not lead to the formation of ammonia upon completion of the process. In the embodiments herein, the aqueous solution has a bulk pH and a local pH in the aqueous solution in the first volume 118, which is in contact with at least a portion of the urea oxidation electrode 104 and which is relatively small and confined to a region in the close vicinity of the of the water reduction electrode 106 and the urea oxidation electrode 104. In some embodiments herein, the bulk pH remains in the range of from about 6 to about 9 during operation of the apparatus. In some embodiments herein, the bulk pH remains at about neutral pH during operation of the apparatus. In some embodiments herein, the local pH is about 11 or greater. In some embodiments herein, the local pH is about 14 or greater.

Some embodiments herein further comprise a structural support 122 for maintaining the urea oxidation electrode 104 and the water reduction electrode 106 in sufficiently close proximity such that the hydroxide anion concentration, produced by the action of the water reduction electrode, is sufficiently high in the aqueous solution in the first volume 118 such that a process for the elimination or removal of urea from the aqueous solution proceeds at a sufficiently high rate so as to be practically useful when the apparatus 100 is in operation. The structural support 122 provides an electrode housing 124 configured to fix the proximity and orientation of the water reduction electrode 106 and the urea oxidation electrode 104 for proper operation of the apparatus 100. The electrode housing 124 is made of non-conductive materials such that the urea oxidation electrode 104 and the water reduction electrode 106 do not short-circuit. In some embodiments herein, the electrode housing 124 is integral with a bounding wall 116 of the reactor cell or container 102. In some embodiments herein, the apparatus 100 is configured to provide for flow of the aqueous solution into and out of the first volume 118, which is in contact with at least a portion of the urea oxidation electrode 104. In some embodiments herein, the electrode housing 124 has openings 126 for flow of the aqueous solution into and out of the first volume 118.

In some embodiments herein, the apparatus is configured for operating in one or more batches to eliminate or remove urea from the aqueous solution. In some embodiments herein, wherein the apparatus is configured for operating continuously to eliminate or remove urea from the aqueous solution. In some embodiments herein, the electrode housing is located outside the bulk storage container or vessel for the aqueous solution. In some embodiments herein, the aqueous solution is pumped or otherwise circulated through; i.e., made to flow through, the electrode housing to enhance the rate of urea removal from the aqueous solution.

Referring to FIGS. 5-10, some embodiments herein are directed to an apparatus 100a for removing or eliminating urea from an aqueous solution 101. The apparatus 100a comprises, at least one reactor cell 102a, at least one urea oxidation electrode 104a, at least one water reduction electrode 106a, at least one counter electrode 108a, and at least one power supply 110a. The reactor cell 102a has an interior capable of containing; i.e., having therein, a quantity of the aqueous solution. The reactor cell 102a is a container having an inlet 128 and an outlet 130. The reactor cell 102a serves as the electrode housing at least for the urea oxidation electrode 104a and the water reduction electrode 106a. In some embodiments, the reactor cell 102a may also house the counter electrode 108a.

The apparatus 100a may receive the aqueous solution, from which urea is to be removed, from an aqueous solution supply 103, which may, for example, be a vessel or tank containing the supply of aqueous solution. The aqueous solution, after treatment for removal of urea, may be stored in a receiving vessel or container 105. Alternatively, the aqueous solution, after treatment for removal of urea, may be discharged to the environment as permitted by local environmental regulations or it may be conveyed to other facilities or apparatuses for further processing. A pump 132 may be used to circulate the aqueous solution through the reactor cell 102a or gravity may be used for this purpose.

In the illustrated embodiment, the urea oxidation electrode 104a, the water reduction electrode 106a, and the counter electrode 108a are disposed in the interior of the reactor cell 102a. The water reduction electrode 106a is configured to produce hydroxide anions at least in the aqueous solution in a first volume 118a in the reactor cell 102a at least when the reactor cell contains the aqueous solution and is in operation. The counter electrode is positioned so as to be in contact with a second volume 120a configured to contain at least a portion of the aqueous solution. The aqueous solution in the second volume 120a is in fluid communication with the aqueous solution in the first volume 118a in the reactor cell 102a when the apparatus 100a is supplied with the aqueous solution.

The power supply 110a is configured to apply one or more voltages between the counter electrode 108a and the water reduction electrode 106a, and between the urea oxidation electrode 104a and the counter electrode 108a. The first volume 118a is in contact with at least a portion of the urea oxidation electrode 104a such that the aqueous solution in the first volume 118a is in contact with at least a portion of the urea oxidation electrode 104a. The urea oxidation electrode 104a and the water reduction electrode 106a are arranged in sufficiently close proximity such that the action of the water reduction electrode 106a produces a hydroxide anion concentration in the aqueous solution in the first volume 118a. The hydroxide anion concentration is sufficiently high, in the aqueous solution in the first volume 118a, so that a process for the elimination or removal of urea from the aqueous solution proceeds at a sufficiently high rate as to be practically useful when the apparatus 100a is in operation.

Figure 12:
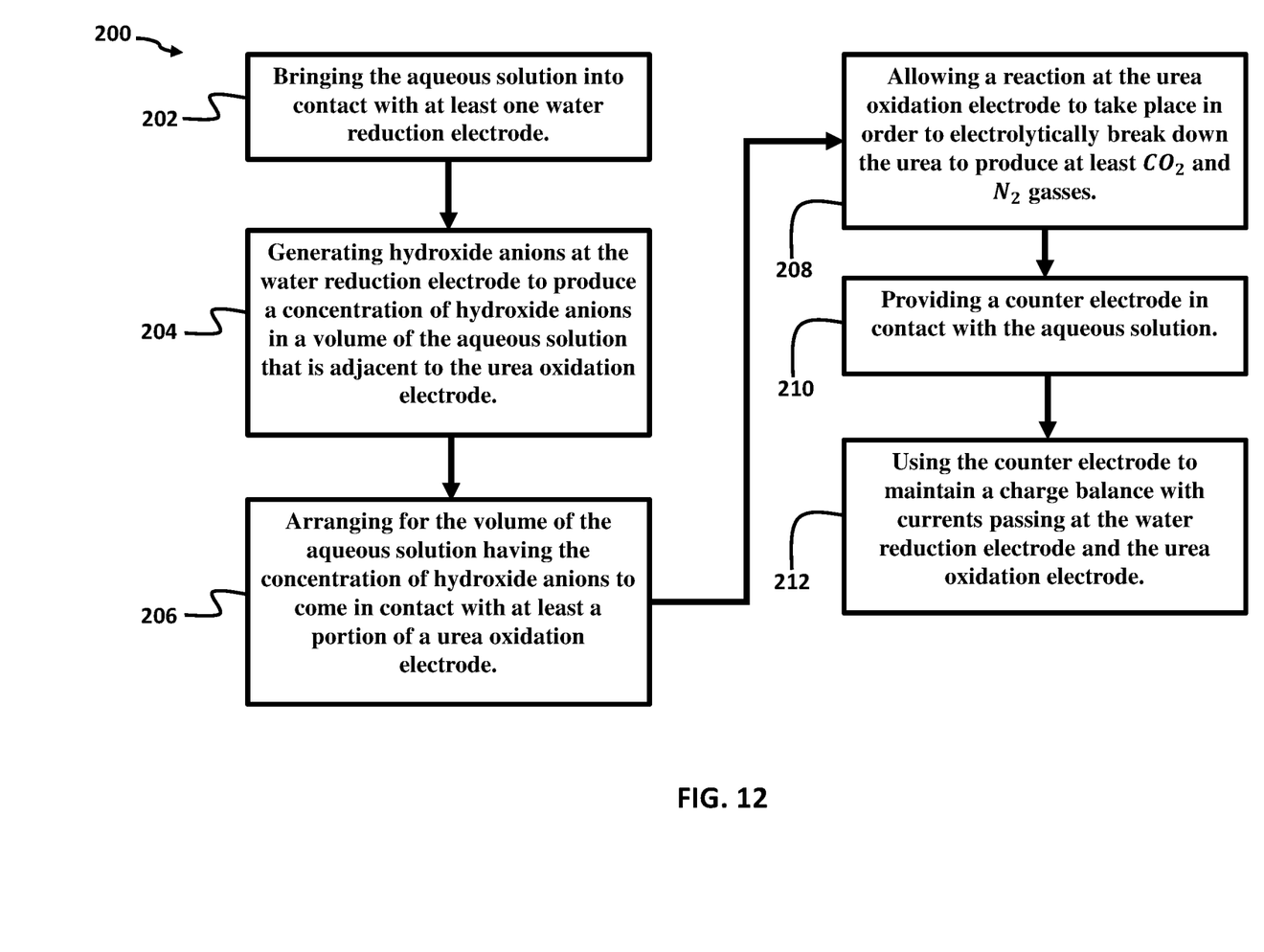
FIG. 12 is a flow diagram illustrating a process for eliminating urea from an aqueous solution in accordance with some of the embodiments herein.

Referring to FIG. 12, some embodiments herein are directed to a method (200) of removing urea from an aqueous solution. The method (200) includes bringing (202) the aqueous solution into contact with at least one water reduction electrode 106, 106a. The method (200) further includes generating (204) hydroxide anions at the water reduction electrode 106, 106a to produce a concentration of hydroxide anions in a volume 118, 118a of the aqueous solution. The method (200) further includes arranging (206) for the volume 118, 118a of the aqueous solution having the concentration of hydroxide anions to come in contact with at least a portion of a urea oxidation electrode 104, 104a. The method (200) further includes allowing (208) a reaction at the urea oxidation electrode 104, 104a to take place in order to electrolytically break down the urea to produce at least $CO_2$ and $N_2$ gasses. The concentration of hydroxide anions is sufficiently high in the aqueous solution in the volume 118, 118a, which contacts at least a portion of the urea oxidation electrode 104, 104a, such that urea removal from the aqueous solution, by electrolytic breakdown of urea, proceeds at a sufficiently high rate as to be practically useful.

The method (200) further includes providing (210) a counter electrode 108, 108a in contact with the aqueous solution, and using (212) the counter electrode 108, 108a to maintain a charge balance with currents passing at the water reduction electrode 106, 106a and the urea oxidation electrode 104, 104a.

In the illustrated embodiments of FIGS. 5-10, the reactor cell 102a houses a plurality of urea oxidation electrodes 104a and a plurality of water reduction electrodes 106a. The urea oxidation electrodes 104a and the water reduction electrodes 106a are interdigitated with alternating rows of urea oxidation electrodes 104a and water reduction electrodes 106a parallel to each other with a small gap in between and the aqueous solution flows over this array of electrodes. The electrode support structure 122a supports the urea oxidation electrodes 104b and the water reduction electrodes 106b in the array arrangement just described. In some embodiments, one or more counter electrodes 108a may also be provided in the reactor cell 102a. In the illustrated example, the counter electrode support structure 123 supports a plurality of counter electrodes 108a in the reactor cell 102a. In one example, the reactor cell 102a is in the form of a tank with an open top. The reactor cell 102a may include an inlet holding chamber 134, an outlet holding chamber 136, and an active section 138 extending between the inlet chamber 134 and the outlet chamber 136. The array of urea oxidation electrodes 104a and water reduction electrodes 106a are provided in one side of the active section 138 and the one or more counter electrodes 108a are provided in the opposite side of the active section 138. A pair of perforated baffles 140, 142 separate the first side of the active section 138, which has the urea oxidation and water reduction electrodes therein, from the second side of the active section 138, which has the counter electrodes 108a therein. The perforated baffles 140, 142 allow fluid communication between the first side of the active section 138 and the second side of the active section 138 while keeping the gases evolved at the counter electrodes 108a separate from the gases evolved at the urea oxidation and water reduction electrodes 104a and 106a. The flow of the aqueous solution through the reactor cell 102a allows for the aqueous solution to be treated continuously.

As explained below, the counter electrodes 108a may be operating in one of two modes. In one mode, oxygen gas is evolved at the counter electrodes 108a, while hydrogen gas is evolved at the water reduction electrodes 106a. Accordingly, the perforated baffles 140, 142 help lessen the risk of an explosion hazard by keeping the gases evolved at the counter electrodes 108a separate from the gases evolved at the urea oxidation and water reduction electrodes 104a and 106a. The first volume 118a defines the local region of high hydroxide anion concentration for the urea oxidation and water reduction electrodes 104a and 106a. The second volume 120a is the local volume with respect to the counter electrodes 108a and is in contact with the counter electrodes 108a.

The gases evolved at the various electrodes in the apparatuses 100 and 100a may be vented to the atmosphere or the gases may be capture using at least two separate fume hoods or capture conduits (not shown) to put these gases to beneficial uses. For example, the captured hydrogen gas may be used as fuel for hydrogen fuel cells. Also, environmental regulations may require gases such as carbon dioxide to be captured and sequestered to reduce greenhouse gas emissions. The baffles 144 and 146 help direct the flow of the aqueous solution through the reactor cell 102a to advantageously increase the dwell time of the aqueous solution in the reactor cell 102a to more completely remove urea from the aqueous solution. The first side of the active section 138 serves as the electrode housing 124a in the apparatus 100a.

Figure 11:
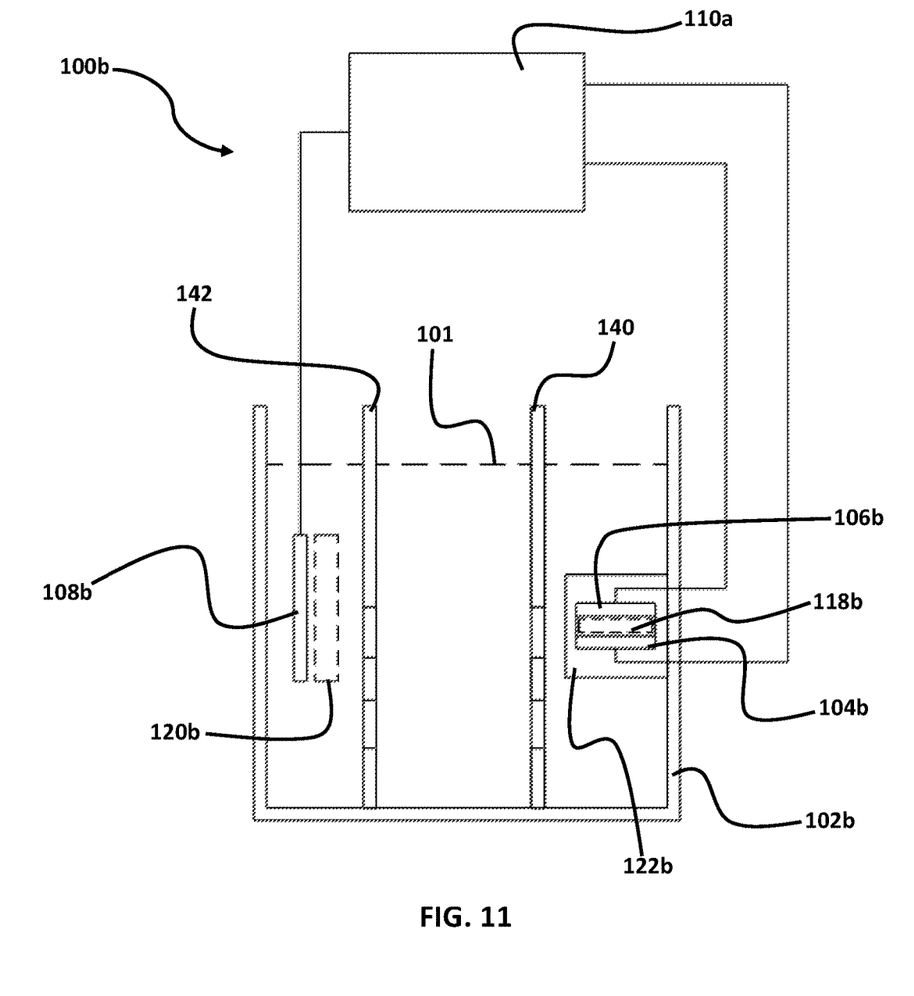
FIG. 11 is a schematic diagram illustrating an apparatus for eliminating urea from an aqueous solution in accordance with a third example of the embodiments herein.

Referring to FIG. 11, an apparatus 100b illustrating an alternative arrangement for the urea oxidation electrodes 104b and the water reduction electrodes 106b can be seen. In this arrangement, the electrode support structure 122b supports the urea oxidation electrodes 104b and the water reduction electrodes 106b in a manner similar to a sandwich with the two electrodes as the top and bottom surfaces with the aqueous solution flowing in between them. Accordingly, the corresponding first volume 118b is also located between the urea oxidation electrodes 104b and the water reduction electrodes 106b. Otherwise, the apparatuses 100a and 100b are identical. The second volume associated with the counter electrode 108b is designated by the reference numeral 120b.

In the apparatuses 100a and 100b the output solution of the reactor cell 102a, 102b may be recirculated back to the inlet of the reactor cell 102a, 102b for a more thorough removal of urea. The arrangement of the urea oxidation electrodes 104a, 104b and the water reduction electrodes 106a, 106b used in apparatuses 100a and 100b may also be used in the electrode housing 124 of the apparatus 100, which would operate in a batch manner.

The operation of the embodiments herein is not intended to limit the scope of the claims but is only presented here to aid in the understanding of the present disclosure.

The embodiments herein are designed to perform the electrolysis of urea dissolved in an aqueous solution with a bulk pH between 6 and 9. The electrochemical reactions describing the electrolysis are shown in equations 1-3:

$$\text{Overall: } CO(NH_2)_2 + H_2O \rightarrow CO_2 + N_2 + 3H_2 \quad (1)$$

$$\text{Anode: } CO(NH_2)_2 + 6OH^- \rightarrow CO_2 + N_2 + 5H_2O + 6e^- \quad (2)$$

$$\text{Cathode: } 6H_2O + 6e^- \rightarrow 3H_2 + 6OH^- \quad (3)$$

Equation 1 shows that the overall reaction results in hydrolysis of urea with $CO_2$, $N_2$, and $H_2$ as final products, instead of the more common $NH_3$ found in enzymatic hydrolysis of urea. Unlike in the enzymatic process, the electrolysis reactions (equations 2 and 3) oxidize urea at an anode, and reduce water at a cathode. The anode reaction requires a catalyst to oxidize urea. Nickel hydroxide [Ni(OH)$_2$] based catalysts have shown the highest activity towards urea oxidation, but require highly alkaline aqueous media to operate. Commonly, this means operating in pH values above 14 by adding 1M or more potassium hydroxide to the solutions. The alkalinity maintains the Nickel in the oxidized Ni(OH)$_2$ or NiOOH phases and aids in providing the 6OH$^-$ ions needed for the reaction, equation 2.

The embodiments herein create the highly alkaline environment, needed to perform the urea oxidation reaction, locally at the surface of the anode while maintaining the bulk pH as neutral (6-9). The embodiments herein accomplish this result by electrochemically reducing water with a second cathode 106 located in close proximity to the urea oxidation anode 104. By reducing water, using the same reaction as equation 3, the second cathode produces an excess of OH$^-$ ions. As current is continually applied to the second cathode 106 OH$^-$ ions continue to build, and are dispersed into the aqueous solution by diffusion and convection. The pH at any point in the solution is defined as:

$$pH = 14 + \log_{10} C_{OH^-} \quad (4)$$

where $C_{OH^-}$ is the concentration of OH$^-$ ions.

Figure 1:
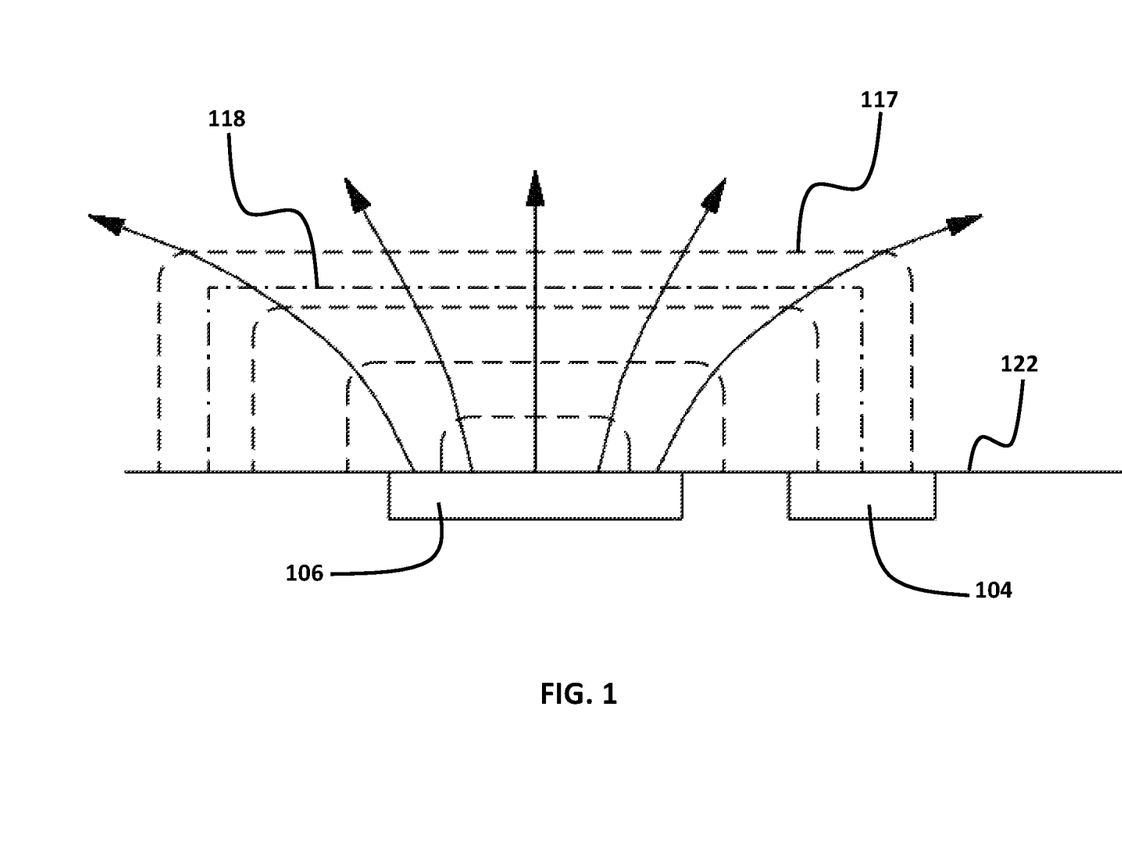
FIG. 1 is a schematic diagram illustrating the spatial arrangement of the water reduction electrode and the urea oxidation electrode in accordance with some of the embodiments herein.
Figure 2:
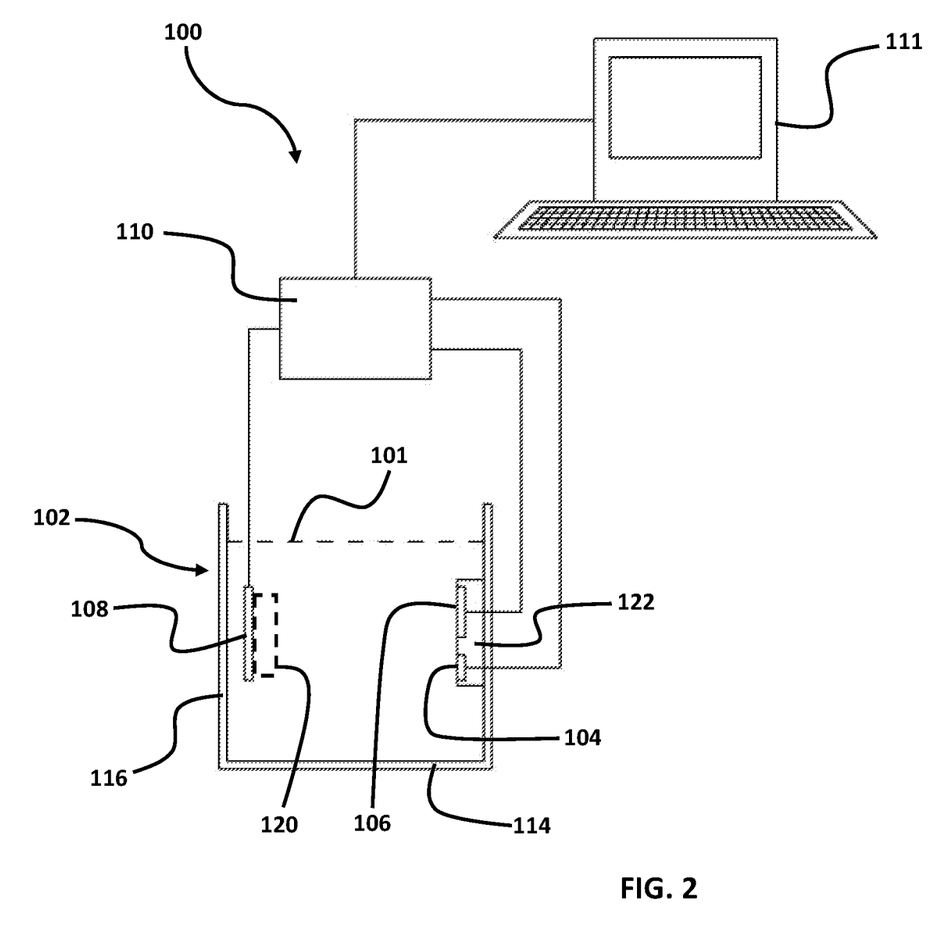
FIG. 2 is a schematic diagram illustrating an apparatus for eliminating urea from an aqueous solution in accordance with a first example embodiment herein.
Figure 3:
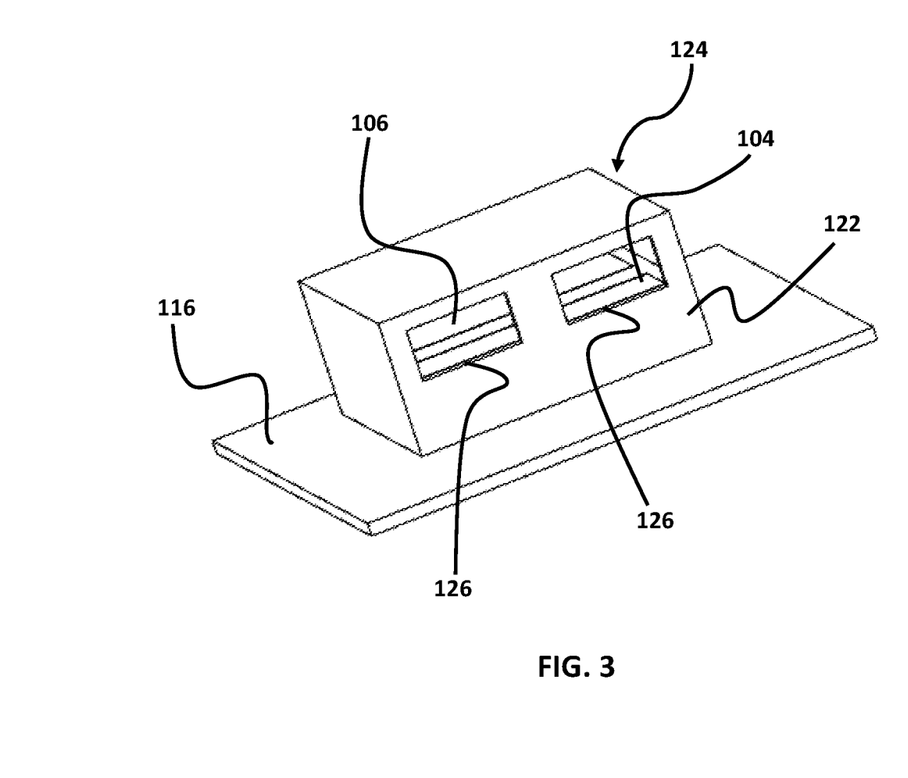
FIG. 3 is a schematic diagram illustrating the electrode housing of an apparatus for eliminating urea from an aqueous solution in accordance with the first example embodiment herein.
Figure 4:
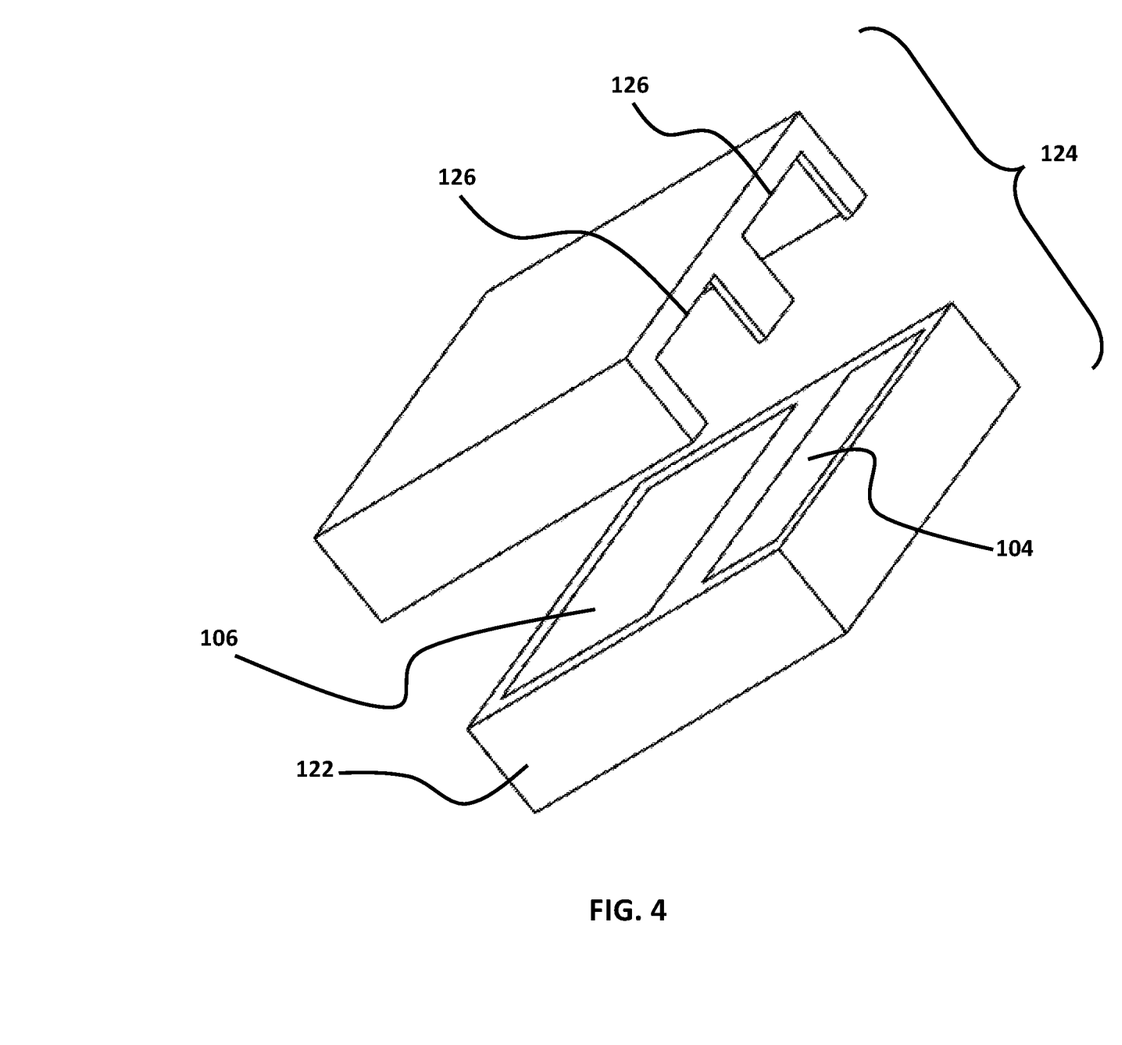
FIG. 4 is a partially exploded view illustrating the electrode housing of an apparatus for eliminating urea from an aqueous solution in accordance with the first example embodiment herein.
Figure 5:
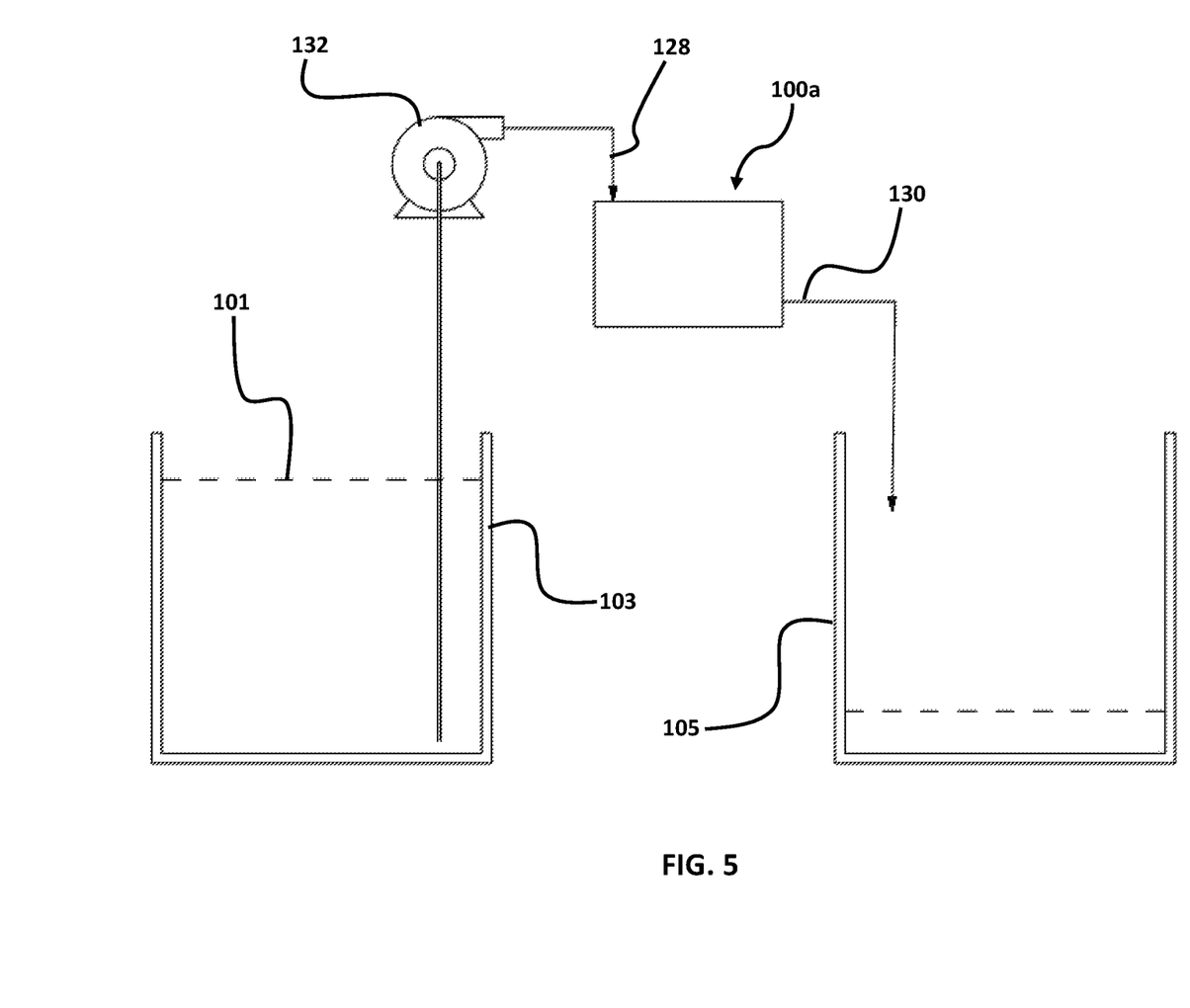
FIG. 5 is a schematic diagram illustrating an apparatus for eliminating urea from an aqueous solution in accordance with a second example of the embodiments herein.
Figure 6:
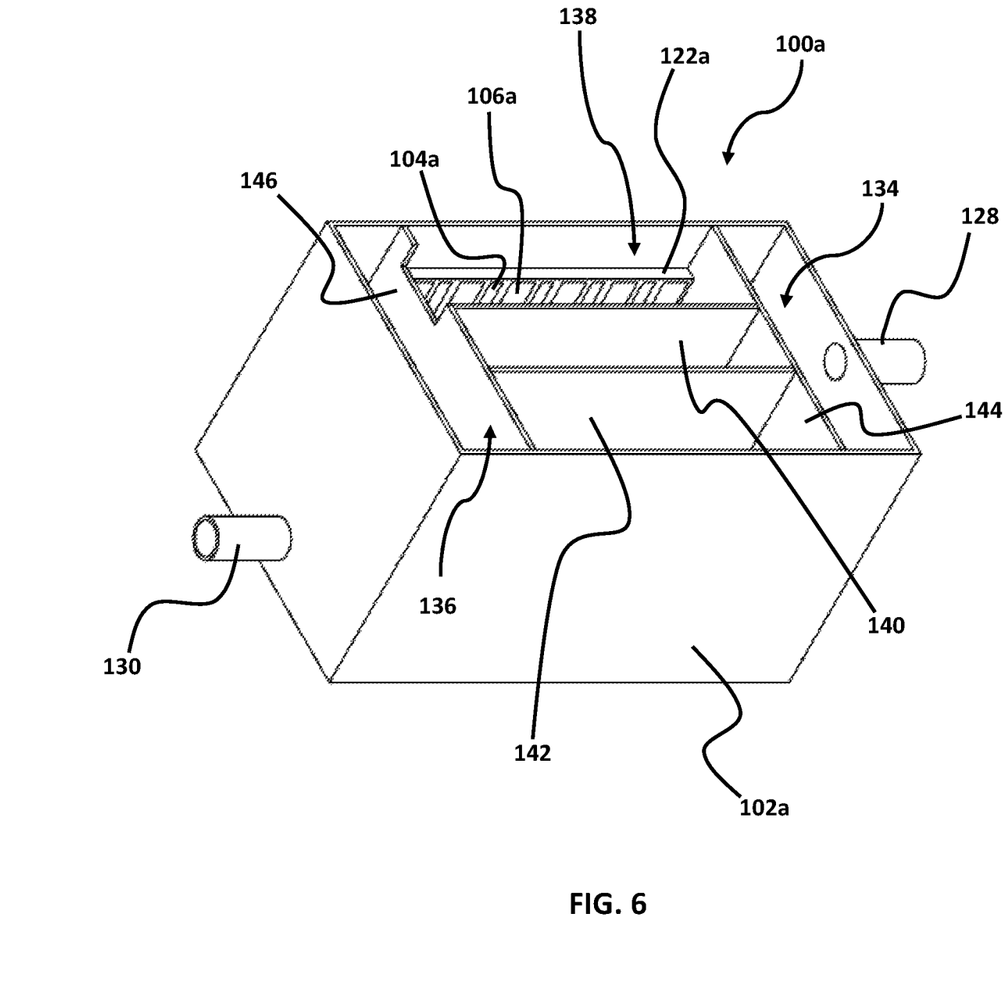
FIGS. 6-10 are schematic diagrams illustrating the details of the reactor cell of an apparatus for eliminating urea from an aqueous solution in accordance with the second example of the embodiments herein.
Figure 7:
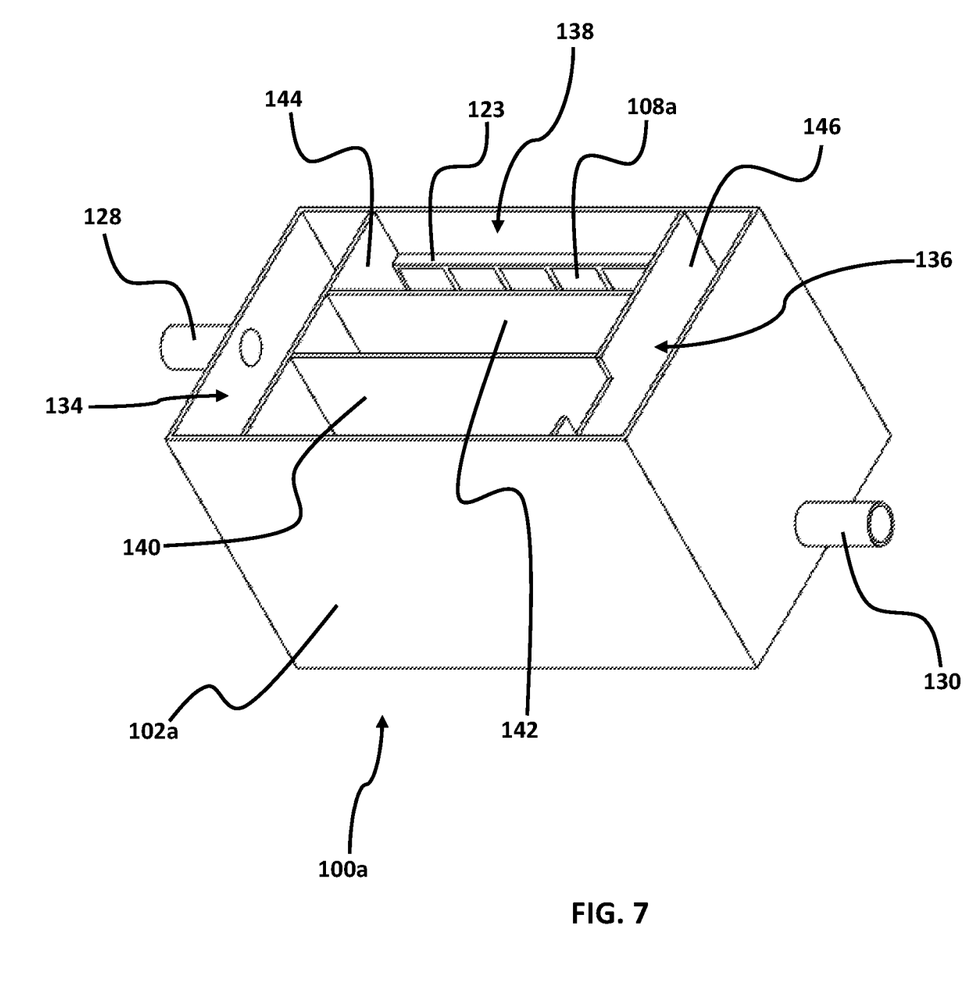
Figure 8:
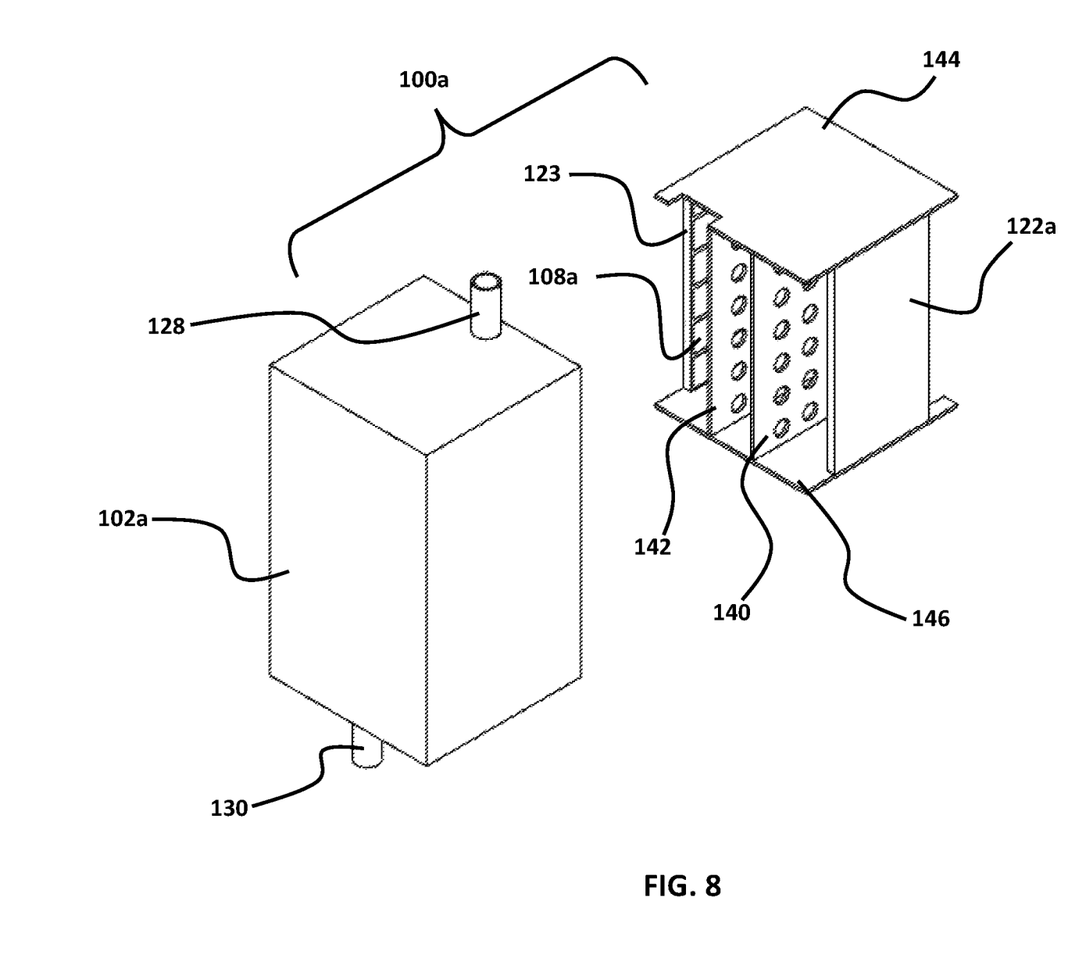
Figure 9:
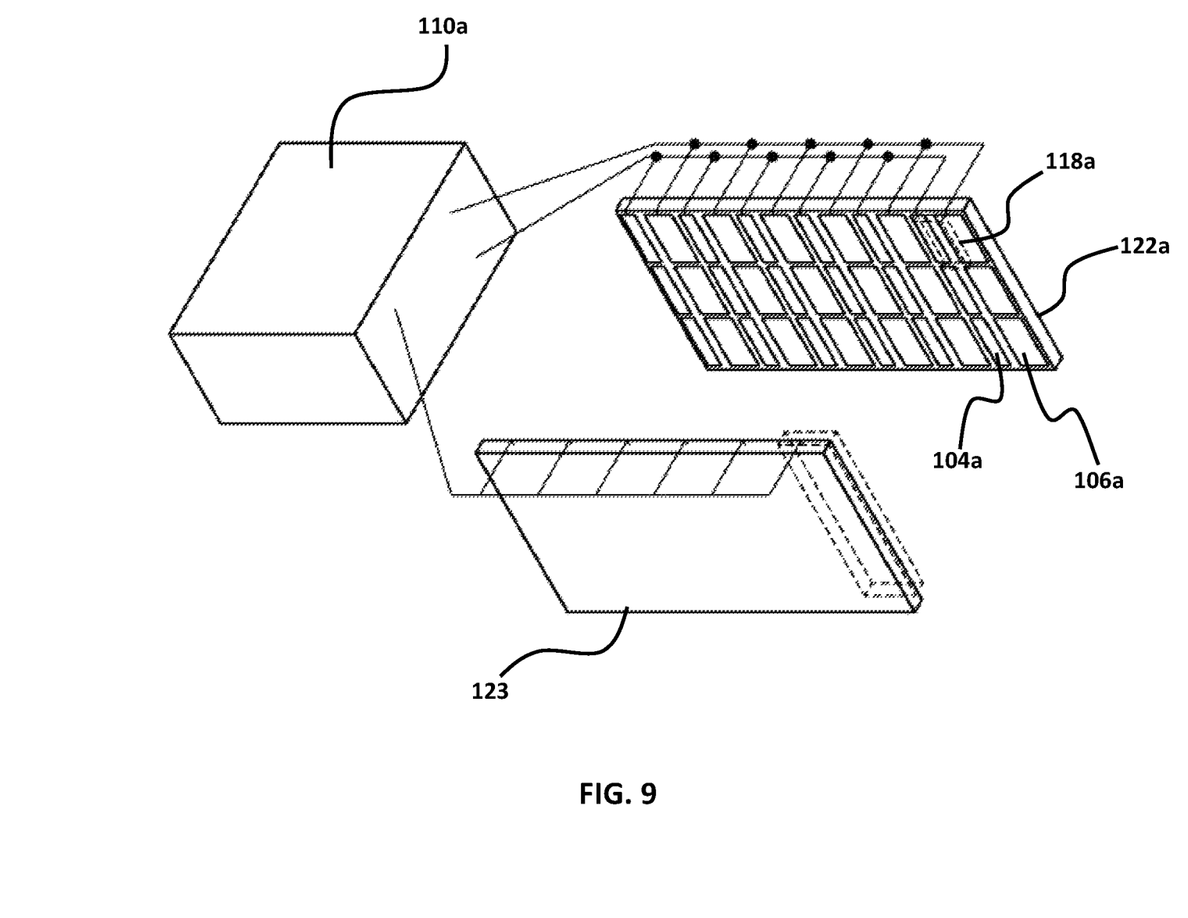
Figure 10:
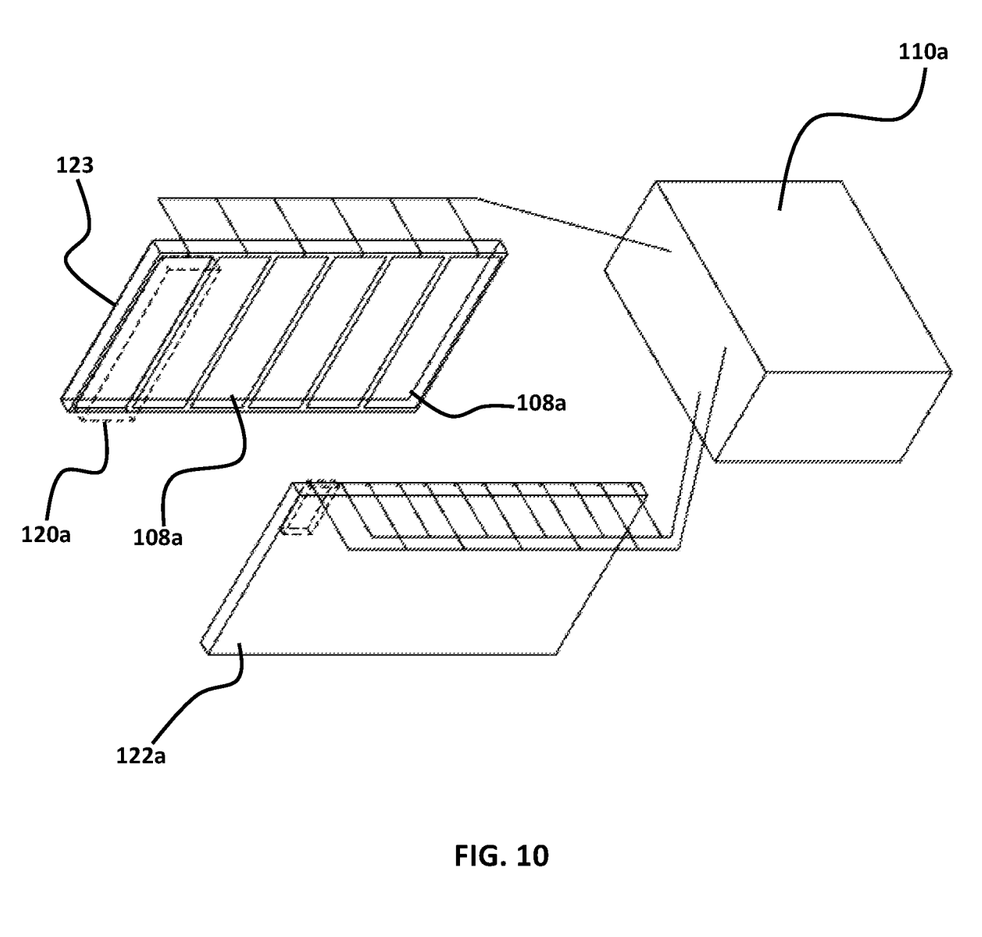

The functional region of the device is depicted in FIG. 1 where the water reduction cathode 106 produces a high concentration of OH$^-$ ions near its surface. The concentration decays further away from the electrode 106 both in the direction normal to the electrode surface and laterally because of diffusion. The urea oxidation electrode 104 is located in close proximity to the water reduction electrode 106 so that it falls into the volume of increased OH$^-$ concentration, thereby experiencing a locally modified pH sufficient to perform the urea oxidation reaction. FIG. 1 depicts the two electrodes as co-planar, but this is not required. The only requirement for electrode placement is that the urea oxidation electrode 104 be in the modified pH gradient at a pH sufficient to perform the reaction. The placement is selected with regards to the distance between the two electrodes (i.e., the distance between $x_1$ and $x_2$ for a coplanar geometry) because most of the urea oxidation reaction occurs at the edge of the urea oxidation electrode 104.

The pH gradient 117 is depicted with contour lines of decreasing pH extending from the water reduction electrode 106 and gradient arrows extending from the electrode surface towards the bulk solution. The shape of the pH gradient 117 can be modified by altering (i) the current applied to perform the water reduction reaction, (ii) the convection of the aqueous solution surrounding the electrode 106, and (iii) the geometry of the local walls bordering the aqueous solution, including the size and spacing of the electrodes 104 and 106.

The functional region 118 depicted in FIG. 1 is the region having a local pH that is sufficiently high to perform the urea oxidation reaction. The remainder of the system is further explained with reference to FIGS. 2-4. To maintain charge balance with the currents passing at the water reduction and urea oxidation electrodes 104 and 106 the system has a counter electrode 108 in the same aqueous solution. To control the electrical currents and/or voltages in the system a controllable power supply may be used to maintain the proper voltages for operation and are in contact with the electrodes with wire or other conductive connections. In the illustrated example, a potentiostat 110 and computer 111 are used to control the electrical currents and/or voltages in the system; however, many other suitable controllable power supply devices may be used to perform this function. Examples of such devices include, but are not limited to, power supplies having embedded microprocessors or proportional, integral, and derivative (PID) controllers. The aqueous solution 101 has a neutral bulk pH ranging from 6 to 9 containing urea dissolved in solution. The aqueous solution 101 may also have other chemical species, such as supporting salts, dissolved in it, but the presence of water and urea are the only requirements for operation. The concentration of urea impacts the diffusion rate to the surface of the urea oxidation electrode 104 and therefore impacts the reaction rate, but there is no known minimum or maximum concentration for the embodiments herein to operate.

The remaining elements of the illustrative embodiment of FIGS. 1-4 are the bounding walls 116 of the apparatus 100 which contain the aqueous solution 101 and the electrodes 104, 106, and 108. The bounding walls 116 maintain the aqueous environment around the electrodes and may have openings (such as openings 126 in the housing 124 that is integral with wall 116) for flow into and out of the reaction environment which would cause convection currents impacting the shape of the pH gradient 117. The electrode housing 124 is meant to fix the proximity and orientation of the water reduction electrode 106 and the urea oxidation electrode 104 for proper operation. The shape of the electrode housing 124 is designed for optimal operation, and is made of inert materials such as PTFE, SiO2, poly-ethylene, or other non-conductive substrates such that the two electrodes 104 and 106 do not short-circuit. Some embodiments herein may incorporate the electrode housing 124 as part of the reaction cell's bounding walls 116.

When the counter electrode is auxiliary to the water reduction, the reaction $2OH^-+2e^-\rightarrow H_2O+\frac{1}{2}O_2$ occurs at the counter electrode; when it balances the urea oxidation, the reaction $2H_2O+2e^-\rightarrow 2OH^-+H_2$ occurs at the counter electrode (thereby also performing the water reduction reaction). Depending on the total currents flowing at the urea oxidation and water reduction electrodes the counter electrode may change the chemistry to balance charges at the electrodes.

The products of this reaction environment are $CO_2$, $N_2$, $H_2$ and $O_2$ gasses. $O_2$ is a by-product of the water electrolysis reaction, and can also be a side reaction simultaneously occurring on the urea oxidation electrode 104. The embodiments herein do not address methods by which to capture or separate the gasses generated in any detail because such methods are within the level of skill of those skilled in the art. The embodiments herein are intended to operate at ambient temperature and pressure, but they are not limited to operating under those conditions. Depending on the urea concentration in the solution to be treated, the concentration of the evolved hydrogen and oxygen gases would typically be too low to present an explosion hazard. Nevertheless, known gas capture and separation process; e.g., selective gas liquefaction, may be used to put the gases to beneficial use or to sequester some of them as may be necessary.

Experimental results have shown that using a rotating ring disc electrode, where the disc is the water reduction electrode and a nickel ring is the urea oxidation electrode, the activity of the local pH system matched pH 11.5 bulk media and matched predictions by the theory of how the pH should change depending on the conditions used.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. An apparatus for removing or eliminating urea from an aqueous solution, the apparatus comprising:
    at least one reactor cell having an interior capable of containing a quantity of the aqueous solution;
    at least one urea oxidation electrode disposed in the interior of the reactor cell;
    at least one water reduction electrode disposed in the interior of the reactor cell, the water reduction electrode being configured to produce hydroxide anions at least in the aqueous solution in a first volume in the reactor cell at least when the reactor cell contains the aqueous solution and is in operation;
    at least one counter electrode positioned so as to be in contact with a second volume configured to contain at least a portion of the aqueous solution, the aqueous solution in the second volume being in fluid communication with the aqueous solution in the first volume in the reactor cell when the apparatus is supplied with the aqueous solution; and
    at least one power supply configured to apply one or more voltages between the counter electrode and the water reduction electrode, and between the urea oxidation electrode and the counter electrode,
    wherein the first volume is in contact with at least a portion of the urea oxidation electrode such that the aqueous solution in the first volume is in contact with at least the portion of the urea oxidation electrode, wherein the urea oxidation electrode and the water reduction electrode are arranged in sufficiently close proximity such that the action of the water reduction electrode produces a hydroxide anion concentration in the aqueous solution in the first volume, and the hydroxide anion concentration is sufficiently high, in the aqueous solution in the first volume, in order for a process for urea removal from the aqueous solution to proceed when the apparatus is in operation.

2. The apparatus of claim 1, wherein the apparatus is configured such that the process for urea removal from the aqueous solution using the apparatus does not lead to the formation of ammonia upon completion of the process.

3. The apparatus of claim 1, wherein the aqueous solution has a bulk pH in the first volume and a local pH in the aqueous solution in the first volume, and wherein the bulk pH remains in the range of from about 6 to about 9 during operation of the apparatus.

4. The apparatus of claim 1, wherein the aqueous solution has a bulk pH in the first volume and a local pH in the aqueous solution in the first volume, and wherein the bulk pH remains at about neutral pH during operation of the apparatus.

5. The apparatus of claim 1, wherein the apparatus is configured to provide for flow of the aqueous solution into and out of the first volume, which is in contact with at least the portion of the urea oxidation electrode.

6. The apparatus according to claim 1, further comprising:
    a structural support for maintaining the urea oxidation electrode and the water reduction electrode in sufficiently close proximity such that the hydroxide anion concentration, produced by the action of the water reduction electrode, is sufficiently high in the aqueous solution in the first volume such that a process for urea removal from the aqueous solution when the apparatus is in operation.

7. The apparatus of claim 6, wherein the structural support is an electrode housing configured to fix the proximity and orientation of the water reduction electrode and the urea oxidation electrode for proper operation.

8. The apparatus of claim 7, wherein the electrode housing is made of non-conductive materials such that the urea oxidation electrode and the water reduction electrode do not short-circuit.

9. The apparatus of claim 7, wherein the electrode housing is integral with a bounding wall of the reactor cell.

10. The apparatus of claim 7, wherein the electrode housing has openings for flow of the aqueous solution into and out of the first volume, which is in contact with at least the portion of the urea oxidation electrode.

11. The apparatus of claim 1, wherein the aqueous solution has a bulk pH in the first volume and a local pH in the aqueous solution in the first volume, which the local pH is in contact with at least the portion of the urea oxidation electrode, and wherein the local pH is about 11 or greater in the urea oxidation electrode.

12. The apparatus of claim 1, wherein the aqueous solution has a bulk pH and a local pH in the aqueous solution in the first volume, which is in contact with at least the portion of the urea oxidation electrode, and wherein the local pH is about 14 or greater.

13. The apparatus of claim 1, wherein the urea oxidation electrode contains nickel.

14. The apparatus of claim 1, wherein the apparatus is configured for operating in one or more batches to remove urea from the aqueous solution.

15. The apparatus of claim 1, wherein the apparatus is configured for operating continuously to remove urea from the aqueous solution.

16. An apparatus for removing urea from an aqueous solution, the apparatus comprising:
a container having an interior and being configured to maintain a reaction environment comprising a quantity of the aqueous solution;
at least one urea oxidation electrode disposed in the interior of the container;
at least one water reduction electrode disposed in the interior of the container, the water reduction electrode being configured to produce a hydroxide anion concentration in a volume containing a portion of the aqueous solution, wherein the apparatus is configured to provide for the aqueous solution in the volume to be in contact with at least a portion of the urea oxidation electrode;
at least one counter electrode disposed in the interior of the container for maintaining a charge balance with currents passing at the water reduction electrode and the urea oxidation electrode; and
at least one power supply configured to apply one or more voltages between the counter electrode and the water reduction electrode and between the urea oxidation electrode and the counter electrode,
wherein the concentration of hydroxide anions is sufficiently high in the aqueous solution in the volume contacting at least the portion of the urea oxidation electrode such that urea removal from the aqueous solution, by electrolytic breakdown of urea, proceeds at a sufficiently high rate as to be practically useful when the apparatus is in operation.

17. The apparatus of claim 16, wherein the aqueous solution has a bulk pH and a local pH in the aqueous solution in the volume that is in contact with at least the portion of the urea oxidation electrode, and wherein the local pH is about 11 or greater.

18. The apparatus of claim 16, wherein the aqueous solution has a bulk pH and a local pH in the aqueous solution in the volume that is in contact with at least the portion of the urea oxidation electrode, and wherein the local pH is about 14 or greater.

* * * * *